United States Patent [19]
Owens

[11] Patent Number: 5,660,003
[45] Date of Patent: Aug. 26, 1997

[54] STRUCTURAL FRAME BASED ON PLURALITY OF TETRAX STRUCTURES

[76] Inventor: Charles R. Owens, 125 S. Reynolds St., Suite J-302, Alexandria, Va. 22304

[21] Appl. No.: 399,048

[22] Filed: Mar. 8, 1995

Related U.S. Application Data

[63] Continuation-in-part of Ser. No. 338,408, Nov. 14, 1994.

[51] Int. Cl.$^6$ .................................. E04B 7/08; E04B 1/18
[52] U.S. Cl. .......................... 52/81.1; 52/311.1; 52/741.1; 52/745.2; 52/DIG. 10; 52/638; 52/648.1
[58] Field of Search ................................ 52/81.1, 311.1, 52/DIG. 10, 741.1, 745.2, 82.2, 638, 648.1

[56] References Cited

U.S. PATENT DOCUMENTS

| | | |
|---|---|---|
| 2,881,717 | 4/1959 | Fuller . |
| 2,905,113 | 9/1959 | Fuller . |
| 2,914,074 | 11/1959 | Fuller . |
| 2,986,241 | 5/1961 | Fuller . |
| 3,063,521 | 11/1962 | Fuller . |
| 3,139,959 | 7/1964 | Kraft . |
| 3,354,591 | 11/1967 | Fuller . |
| 3,810,336 | 5/1974 | Sadao . |
| 3,897,164 | 7/1975 | Dodino ........................... 52/574 X |
| 3,970,301 | 7/1976 | Lehmann ..................... 52/DIG. 10 X |
| 4,059,932 | 11/1977 | Resch . |
| 4,156,997 | 6/1979 | Decker . |
| 4,207,715 | 6/1980 | Kitrick . |
| 4,238,905 | 12/1980 | MacGraw, II ............... 52/DIG. 10 X |
| 4,679,361 | 7/1987 | Yacoe . |
| 4,711,062 | 12/1987 | Gwilliam et al. . |
| 4,723,382 | 2/1988 | Lalvani ......................... 52/DIG. 10 X |
| 4,796,394 | 1/1989 | Chastain . |
| 5,070,673 | 12/1991 | Weisse . |
| 5,230,196 | 7/1993 | Ziegler . |
| 5,261,194 | 11/1993 | Roberts . |
| 5,329,737 | 7/1994 | Roberts et al. . |
| 5,331,779 | 7/1994 | Hing . |
| 5,448,868 | 9/1995 | Lalvani ......................... 52/DIG. 10 X |

FOREIGN PATENT DOCUMENTS

| | | |
|---|---|---|
| 2159969 | 6/1972 | Germany . |
| WO81/00130 | 1/1981 | WIPO . |
| WO89/04902 | 6/1989 | WIPO . |

OTHER PUBLICATIONS

Gasson, Geometry of Spatial Forms, pp. 252 and 253. Nov. 1983.

*Primary Examiner*—Christopher T. Kent
*Attorney, Agent, or Firm*—McAulay Fisher Nissen Goldberg & Kiel, LLP

[57] ABSTRACT

A structural frame is composed of a series of struts which are arranged in a particular fashion that steers the stress applied to the frame so as to minimize development of tension and maximize the resolution of the stress in terms of compression. The frame is composed of a plurality of unicubes which are twelve equal length struts arranged to form the edges of a cube and eight additional equal length struts extending out from each corner of the cube. Each of the eight outwardly extending struts forming an equal angle with each of the three cube edge struts to which it is connected. The outboard ends of these outwardly extending struts are connected together so that sets of four such outboard strut ends are connected to form a network of these unicubes, which network constitutes the structural frame.

19 Claims, 4 Drawing Sheets

STRUCTURAL FRAME BASED ON PLURALITY OF TETRAX STRUCTURES

REFERENCE RELATED TO APPLICATION

This application is a continuation-in-part of patent application Ser. No. 08/338,408 filed on Nov. 14, 1994 and entitled "Stress Steering Structure".

BACKGROUND OF THE INVENTION

This invention relates in general to structures such as load bearing frames and trusses and more particularly to structures that provide an enhanced trade off between the stress that can be safely carried in relation to the amount of material required for the structure.

This enhanced strength to weight ratio is a goal of a large number of designs including many of those proposed and constructed by Richard Buckminster Fuller. In most contexts where load bearing frames and trusses are employed, failure occurs because of a failure in tension rather than in compression. Although the loads imposed primarily induce compressive stress in the material, that stress is resolved within the material by vectors which introduce tension. For example, a dome subject to load will tend to deflect in such a fashion as to introduce tension along the trusses that constitute the dome. Failure will occur because of a failure in tension. Much attention has been paid to developing materials which have great tensile strength for use in load bearing structures in such a way as to employ the tensile strength of these materials so that loads supplied will be resolved, at least in part, by the tension created in these tension members. Such an approach is outlined in the Buckminster Fuller U.S. Pat. No. 3,354,591 issued in 1967. A more recent improvement on that structure is set forth in U.S. Pat. No. 4,207,715 issued in 1980. This combination of tension and compression members is also disclosed in the structure shown in U.S. Pat. No. 4,711,062 issued in 1987.

BRIEF DESCRIPTION

This invention is in a framework type of structure composed of a plurality of struts. Each strut is ideally equal in length and is deployed in such a fashion as to cause the stress applied to the structure to be resolved within the structure in a way that minimizes the creation of tensile stress.

The set of struts can be analyzed as a plurality of interconnected sets of building blocks. These building blocks which when interconnected constitute the framework of this invention can be looked at in three different ways. That is, depending upon where one breaks apart the set of struts which constitutes the framework of the invention, one can end up with any one of three distinctly different sets of building blocks. Two of these sets are true building blocks. The other is a bit more abstract in that individual struts do double duty and are considered as constituting edges of two or more of the particular sub frames involved.

A first set is a twenty strut building block which is called by Applicant a "Unicube". It is a frame in which twelve struts define a cube. From each of the eight corners of the cube, a single strut extends outward in such a fashion as to form an equal angle with each of three adjacent edge struts of the cube. A plurality of these unicubes connected by the outboard ends of the struts which extend from the corners of the cube creates a framework or truss in accordance with the teachings of this invention.

A second set is composed of two buildings blocks. They are tetrax frames and cubic frames. Each tetrax frame is the four struts which extend from the center point of a tetrahedron to the four corners of a tetrahedron. Each cubic frame is the twelve struts that define the edges of a cube. The outboard end of each tetrax strut is connected to the corner of a cubic frame and, correspondingly, each corner of a cubic frame is connected to the outboard end of a strut of a tetrax frame. Thus from the eight corners of a cubic frame, eight tetrax frames will extend outwardly. Correspondingly at the outboard ends the four struts of a tetrax frame, there will extend four cubic frames each of which is connected at its corner to the strut of the tetrax. Since there are four outboard ends of a tetrax frame and eight corners of a cubic frame, this arrangement requires that there be twice as many tetrax frames as cubic frames.

A third set is not exactly a building block. The third set is the edge frame of the truncated rhombic dodecahedron (TRD) that is disclosed in detail in the referenced patent application. A structure composed of the edge struts defining a plurality of truncated rhombic dodecahedra will generate the frame of this invention. However, it has to be understood that in a packed set of TRDs each edge would be common to three of these TRDs. The framework of this invention is a framework which constitutes the common struts so that the three edges of adjacent TRDs are represented by a single strut rather than by three parallel coincident struts.

FIGS. 1 through 6 illustrate these three sets or building blocks. FIGS. 1 and 2 show two views of a unicube. FIGS. 3 and 4 show the tetrax and cubic frame, respectively. FIGS. 5 and 6 show two views of a TRD frame. FIG. 5 shows an opaque TRD representing only the visible edges of the TRD.

DEFINITIONS

Applicant hereby adopts the following terms. These terms are used in the specification and the claims in accordance with the following definitions.

Unicube.

A unicube consists of twenty equal struts connected to one another. Twelve of the struts define the edges of a cube and thus are a cubic frame. Eight of the struts extend outward from the eight corners of the cube in a direction so that each of these outwardly extending struts forms an equal angle with each of the three cubic frame struts to which it is connected. The twelve struts that define the cube are called cubic struts and the eight struts that extend outward from the corners of the cube are called outwardly extending struts.

Figure 2:
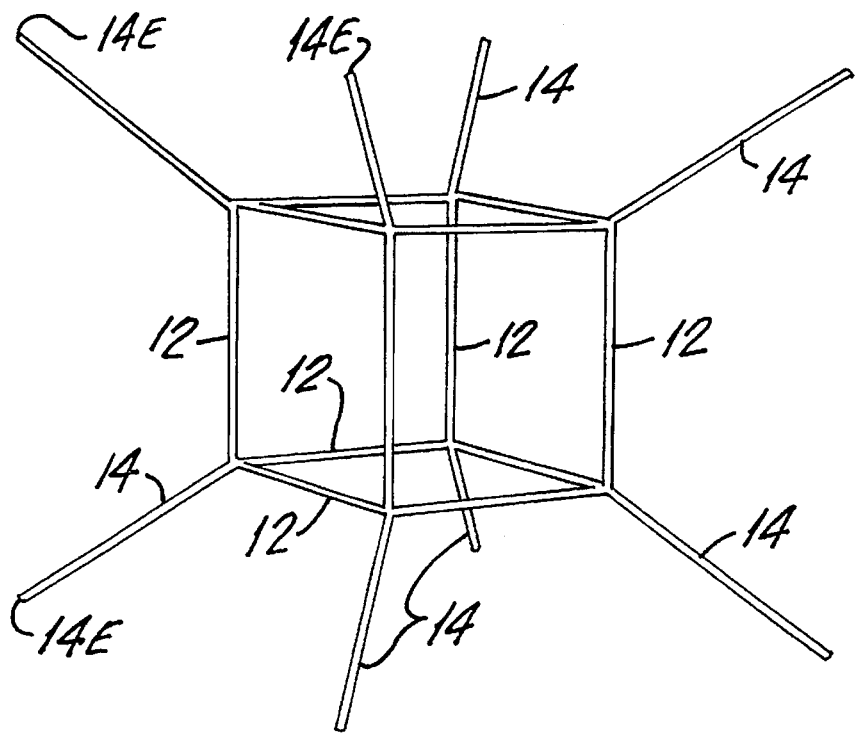
FIG. 2 is a perspective view of the actual unicube showing all twelve struts of the center cube and the eight outwardly extending corner struts.

The outwardly extending struts of a single unicube each have an outer end. FIG. 2 illustrates a unicube.

Cubic Frame.

Figure 4:
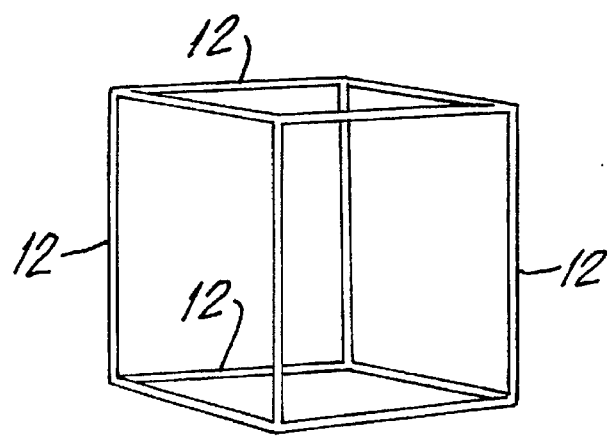
FIG. 4 is a perspective view of a cubic frame; this cubic frame being the center cube of a unicube.

A cubic frame consists of a set of struts defining the twelve edges of a cube. A cubic frame constitutes one of two building blocks of an optimum structure of this invention. The other building block is the tetrax, defined below. A cubic frame is illustrated in FIG. 4.

Tetrax.

Figure 3:
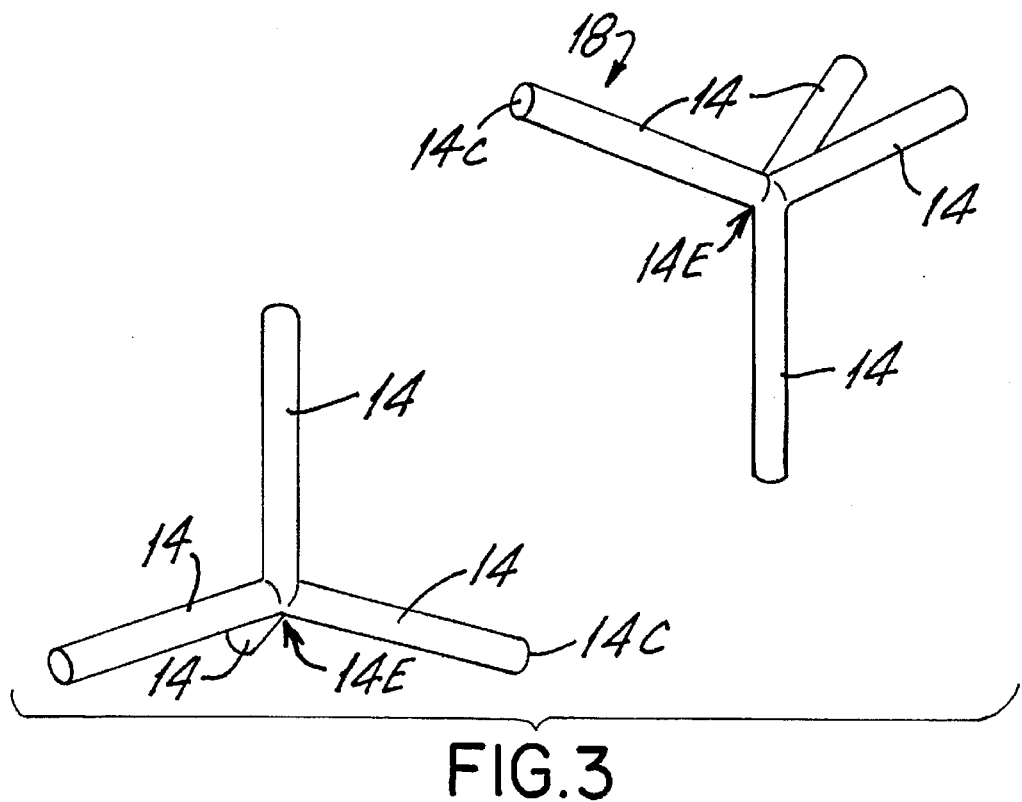
FIG. 3 shows two views of the four strut tetrax which is also referred to herein as the tetrax frame.

The tetrax is the four equal sized axes extending from the center point of a tetrahedron to the four corners of the tetrahedron. The mutual angle between any two of the struts or legs of the tetrax is 109.47°. A plurality of tetraxes and a plurality of cubic frames can be combined to create an optimum structural frame of the invention. This tetrex is also called a tetrax frame herein. FIG. 3 illustrates a tetrax.

Tetrax Structure.

A tetrax structure is a four strut structure or building block that approximates a totrax. The four struts are all connected to a common point. But the struts may not be equal in length and may deviate somewhat from the 109.47° angle between any two of the struts. A tetrax structure may be used as a building block in an embodiment of the invention which is less than optimum. The limits of how much a tetrax structure can deviate from a tetrax frame and still be usable in some embodiment of this invention is discussed in greater detail under the detailed description.

Truncated Rhombic Dodecahedron (TRD).

This is the term applied to a rhombic dodecahedron in which the six vertices that have four edges extending therefrom are truncated. Truncating each of the six four-edge vertices of each rhombic dodecahedron at approximately the midpoint of the edge and removing the truncated portions provides the TRD as defined herein. A more extensive discussion of the TRD appears in the related application Ser. No. 08/338,408.

DESCRIPTION OF THE PREFERRED EMBODIMENTS

Figure 1:
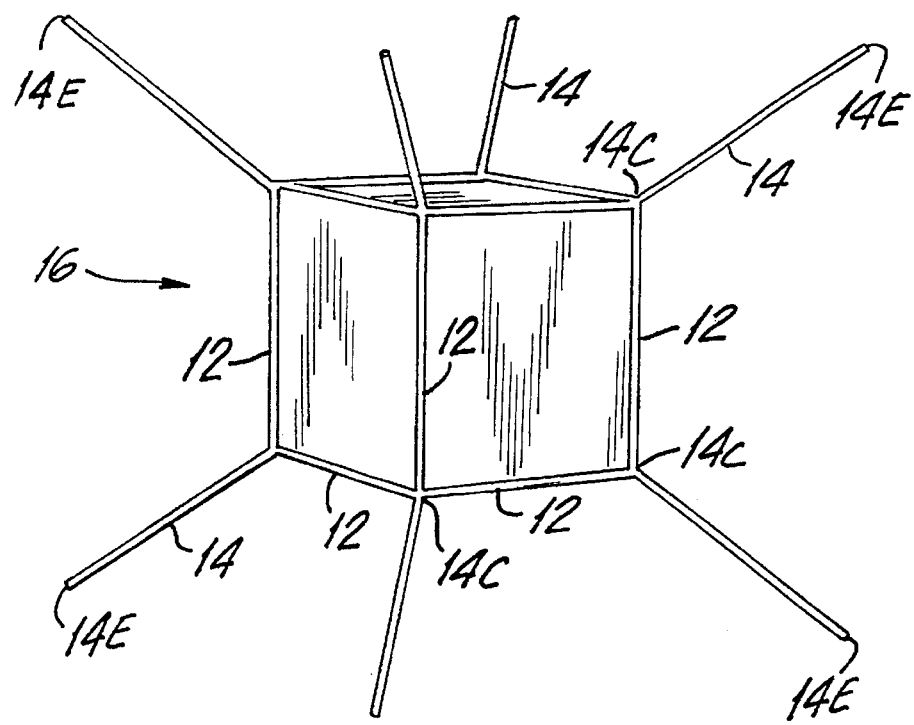
FIG. 1 is a perspective view of the unicube in which the center cube is in opaque form so that only visible struts can be seen.

FIGS. 1 and 2 illustrate one form of the building block of this invention. It is referred to herein as a unicube 10. As shown in FIG. 1, there are twelve struts 12 which form the edges of a cube. There are eight struts 14 which extend outward from the eight corners of the cube. Each outwardly extending strut 14 forms an equal angle with each of the three cube edge struts 12 that form the corner from which the strut 14 extends. The struts 14 and 12 are all equal in length.

Figure 7:
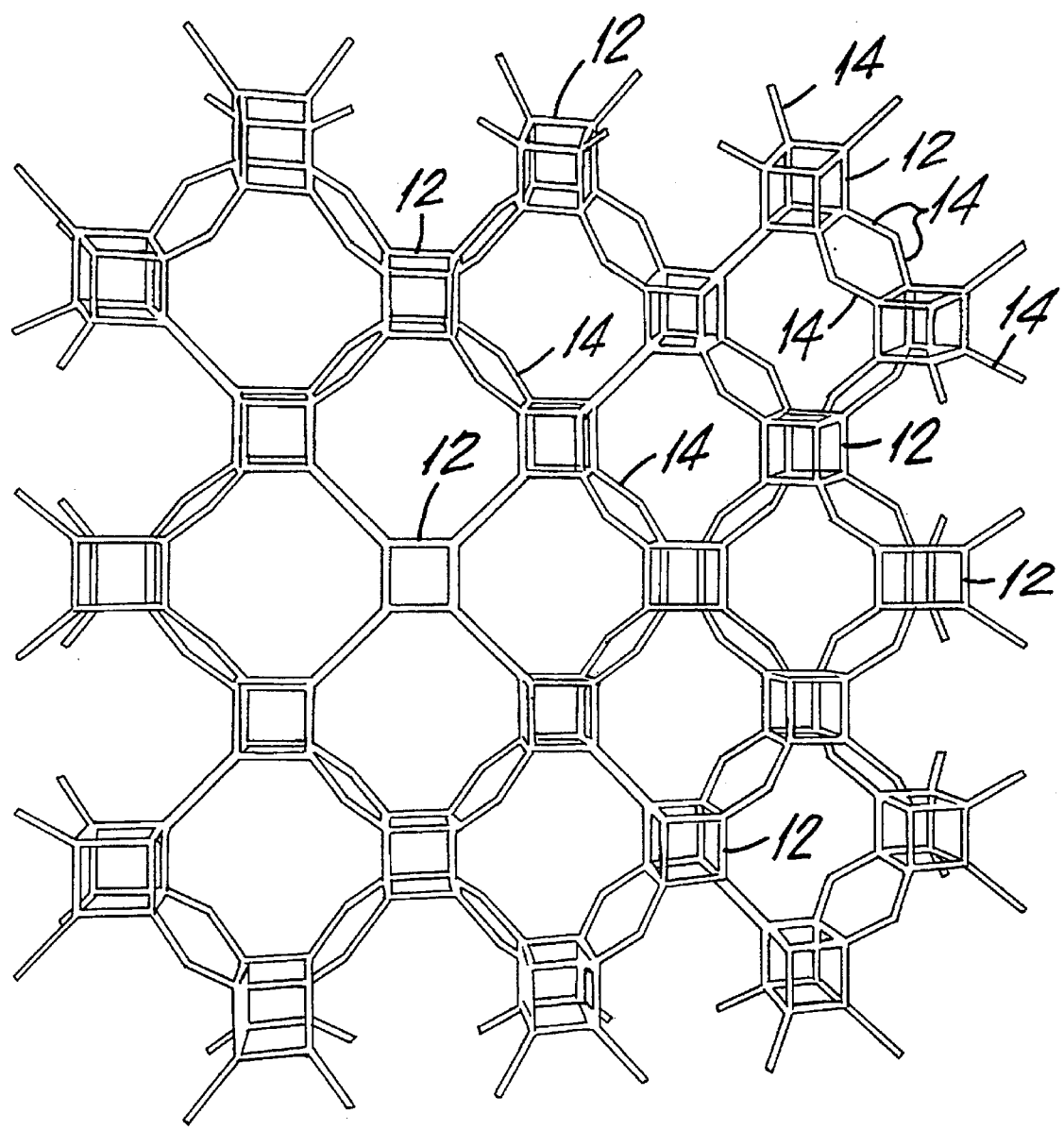
FIG. 7 is a two dimensional aggregation of the FIG. 1 unicubes showing the connection of the outwardly extending struts 14 of adjacent unicubes in essentially a shell.

In order to facilitate viewing this unicube 10 building block, FIG. 1 shows the cube as opaque. Since the structure itself is a series of struts, FIG. 2 is the more accurate representation. In building the framework of this invention from the FIG. 1 unicube, the outboard ends 14E of each of the struts 14 is attached to an outboard end 14E of three other unicubes. FIG. 7 is designed to illustrate and suggest this arrangement. In FIG. 7 only three, not four, ends 14E are illustrated as being connected in order to provide a clearer presentation.

A plurality of the FIG. 2 unicubes 10 connected by their strut ends 14E to each other will create an optimum frame embodiment of this invention. It should be noted that each end 14E is connected to three other ends 14E of three other unicubes. Thus any set of four connected unicubes will share only one common point.

FIGS. 3 and 4 illustrate another form of the building blocks of this invention.

One of the building blocks is a cubic frame 16 shown in FIG. 4 and the other is a tetrax frame 18 shown in FIG. 3.

Each cubic frame consists of twelve struts 12 defining the edges of a cube. Each cubic frame 16 has eight corners. Each tetrax frame 18 is constituted by four struts 14 which comprise the corner axes of a tetrahedron. The four struts are equal in length, extend out from a center point 14E to which all four struts are connected and in which any two of the struts have a mutual angle of 109.47°. That is, there are six angles involved in these four struts, taking two at a time. Each angle has a value of 109.47°. If the four end points 14C of these four struts are considered to be the four vertices of a regular tetrahedron, then these four struts are the four lines which extend from the center of the tetrahedron to the four vertices of the tetrahedron.

The end point 14C of each tetrax is connected to a corner of a cubic frame and the corner of each cubic frame is connected to an end point 14C of a tetrax. Since there are four end points 14C to each tetrax and eight corners to a cubic frame, there are twice as many tetrax frames as there are cubic frames in the structure of this invention.

In the preferred embodiment, the tetrax frame is a true tetrax in which each strut is equal in length and has internal angles of 109.47°. The internal angle is the angle between any two of the four struts.

Relation Between Unicube Cubic Frame and Tetrax.

Each strut 14 of a tetrax is an outwardly extending strut of a unicube in the assembled structure. FIG. 7 may aid in seeing this relationship. Thus the same reference number "14" is used for the struts. Similarly, the cubic struts 12 of the unicube are the cubic frame 16 in the assembled structure. Thus the end point 14E of the strut 14 in the unicube is the center point of the tetrax struts. And the end point 14C of the tetrax struts is the corner point of the cubic frame 16.

Similarly the center point of the cubic frames 16 is the center point of the cubes of the unicube.

The center point of all of the cubic frames 16 is a set of points having a relationship to each other such that each member of this set of center points will be equal distant from the twelve neighboring members of the set of points. This relationship is important because that set of points must always be spaced from the set of struts 12, 14 so as to avoid transmission of forces along a strut through those points. By avoiding the transmission of forces through the set of center points, the forces are steered in such a fashion as to minimize the development of tension.

The closer the arrangement is to the preferred embodiment, the less tension will be developed. However, some deviation in uniform length of struts 12, 14 and in the center angle of the tetrax 18 as well as in the right angle of the cube 16 can be tolerated while still obtaining much of the improvement of this invention which improvement is to minimize the development of tension in the struts of the structure. Accordingly, the term tetrax structure is used herein to refer to a four strut structure based on the tetrax 18 but having less than ideal equal length struts and/or less than ideal internal angles. Thus a tetrax structure is a tetrax modelled structure that provides a significant improvement in the stress steering.

FIG. 7 illustrates a panel approximately two unicubes deep constructed in accordance with the teachings of this invention. This network of struts 12, 14 can be used to produce a number of a wide range of building structures such as a wall truss, a floor truss, a dome and an arch as well as many other structural components. The structures can be made extremely light compared to comparable structures made by other techniques because they resolve loads in terms of compression rather than in terms of tension. Thus the structures take full advantage of the high compressive strength to weight ratios as opposed to much lower tensile strength to weight ratios.

It might be noted that the struts can be made of any suitable material such as steel, aluminum, fiber, reinforced plastic or ordinary plastic struts. The strut material as well as its length and cross-sectional size will be a function of the particular design requirements of the structure involved. The struts can be joined to one another using any known technique such as bolting, welding, or being cast as integral cubic and tetrax building blocks.

The surface of the structural frame created in accordance with this invention would normally be closed and preferably smooth in some sense. Thus at the boundary, the struts 12 or 14 will connect to some structure that is not part of the structural frame of this invention.

Hypothesis as to Stress Steering.

The framework of this invention steers stresses due to loads in such a fashion as to minimize the development of tension and resolve these stresses as stresses in compression.

Figure 5:
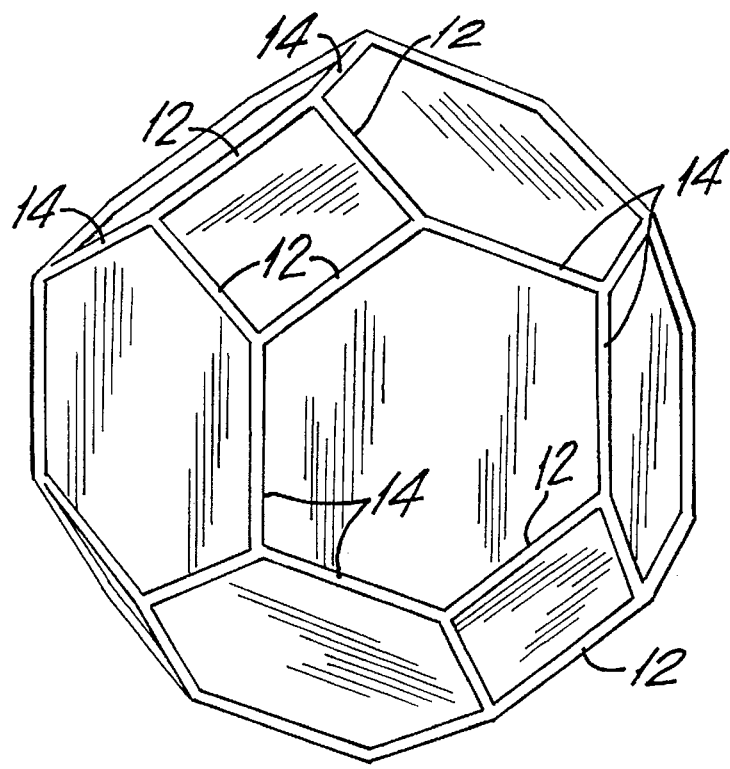
FIG. 5 is a perspective view of an opaque truncated rhombic dodecahedron (TRD) thereby representing only the visible edges of an opaque TRD.
Figure 6:
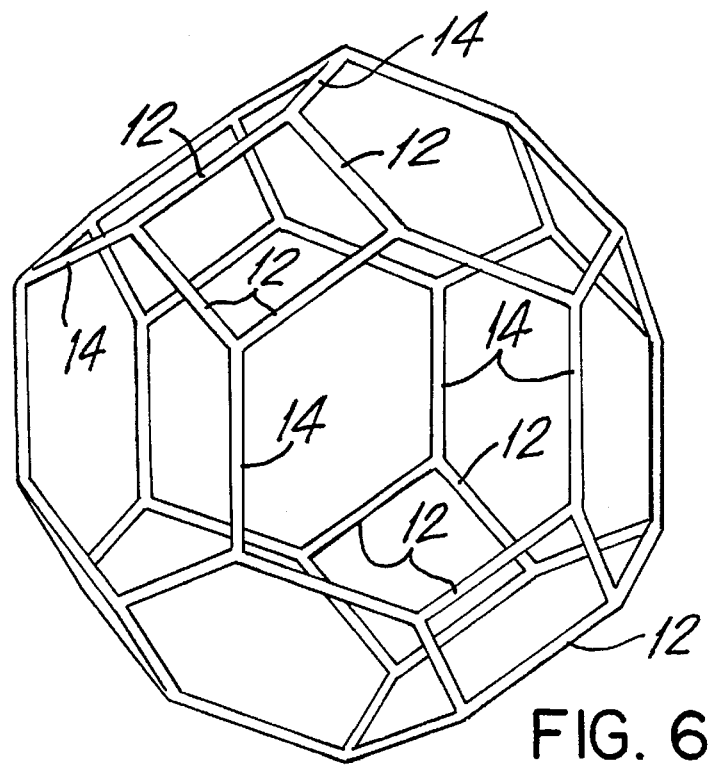
FIG. 6 is a perspective view of an actual TRD showing all edges thereof.

Applicant believes that an understanding of why this occurs may best be obtained from a consideration of the TRD arrangement shown in FIGS. 5 and 6. The TRD is a closed structure having six square frames and twelve hexagon frames. Pairs of these square frames and pairs of the hexagon frames are parallel to one another. All edges are exactly equal in length. The set of struts 12, 14 that form an optimum embodiment of this invention (that is, true cubic frames and tetraxes with all equal struts) will also define TRDs. The TRDs are not strictly building blocks because each strut 12 and 14 will be common to three TRDs.

It is believed significant that the volume of this truncated rhombic dodecahedron (TRD) is very nearly equal to the volume of a regular sphere which would be inscribed within the TRD. An aggregation of independent spheres would transmit forces only in compression. Of course, they would fly apart unless they were constrained at their ends. Viewing the frame of this invention as composed of interconnected TRDs is believed to suggest why the frame steers stresses in a fashion similar to that which would occur if they were independent spheres. But because of the interconnection of the TRDs, they do not fly apart.

It is believed that additional reinforcing struts that do not conform to the pattern of the struts described above will normally provide no useful benefit and will usually result in some degradation from optimum performance. For example, a diagonal strut along the surface of the cubic frame 16 might appear to provide additional rigidity and strength. Applicant believes that the main result of such an additional strut would be to deflect the optimum force steering created by the struts 12, 14 of this invention and thereby increase the development of tension in certain strut members. At the best such additional struts would provide no improvement in reducing tension yet create additional cost and weight.

Furthermore, additional struts that go through the center of the cubic frames 16 or through points defined by the center of the cubic frames would undercut the objectives of this structure by causing forces to be resolved in a fashion that would tend to increase the tension developed rather than minimize the tension.

The tetrax and cubic frame strut building blocks are so connected that each end point of a tetrax leg or strut is connected to a corner of a cubic frame strut and each corner of a cubic frame strut is connected to an end point of a tetrax strut. It should be noted that this description of combining cubic frame and tetrax building blocks does not literally apply to the surface zone of the framework. That is, the framework has to come to an end some place.

What is claimed is:

1. A load bearing structural frame comprising:

a plurality of spaced apart tetrax structures, said tetrax structures having four rigid compression bearing struts extending from a common origin, each of said struts in each of said tetrax structures having an end point, said end points of said struts of eight adjacent ones of said tetrax structures constituting a first set of eight points, there being a plurality of said first set of points, each of said first sets of eight end points interconnected by a predetermined rigid compression bearing structure, said predetermined structure having an envelope encompassing one of a second set of predetermined points in said structural frame, each of said second set of points spaced an equal distance from twelve and only twelve adjacent ones of said second set of points.

2. The structural frame of claim 1 wherein:

said predetermined structure is a set of interconnecting rigid struts, each of said interconnecting struts connecting end points of struts from separate ones of said tetrax structures.

3. The structural frame of claim 1 wherein:

each of said tetrax structure struts is substantially 109.47° from each of the three connecting tetrax structure struts.

4. The structural frame of claim 2 wherein:

each of said tetrax structure struts is substantially 109.47° from each of the three connecting tetrax structure struts.

5. The structural frame of claim 1 wherein:

each of said tetrax structure struts is substantially equal in length to one another thereby constituting a tetrax.

6. The structural frame of claim 3 wherein:

each of said tetrax structure struts is substantially equal in length to one another thereby constituting a tetrax.

7. The structural frame of claim 4 wherein:

each of said tetrax structure struts is substantially equal in length to one another thereby constituting a tetrax.

8. The structural frame of claim 2 wherein:

said predetermined structure is a cubic frame.

9. The structural frame of claim 4 wherein:

said predetermined structure is a cubic frame.

10. The structural frame of claim 7 wherein:

said predetermined structure is a cubic frame.

11. A load bearing structural frame comprising:

a plurality of interconnected tetrax frames and cubic frames, each tetrax frame having four rigid compression bearing struts extending from a common origin and each cubic frame having twelve rigid compression bearing edge struts, all of said cubic frame and tetrax frame struts being substantially equal to one another, said cubic frames and tetrax frames being interconnected such that the outboard end of each tetrax strut is connected to a corner of a cubic frame and the corner of each cubic frame is connected to the outboard end of a tetrax strut, whereby four struts extend from the center point of each tetrax frame and four struts extend from the corner of each cubic frame, and whereby the set of points determined by the center point of each cubic frame is such that each member of said set of points is spaced an equal distance from twelve and only twelve adjacent members of said set of points.

12. A building block for a load bearing structural frame comprising:

a twelve rigid compression bearing strut cubic frame having eight corners, and eight outwardly extending rigid compression bearing struts, one each extending outwardly from a separate one of said eight corners, each of said outwardly extending struts having an outer end.

13. The building block of claim 12 wherein each of said twelve struts is equal in length.

14. The building block of claim 12 wherein the angles between each of said outwardly extending struts and the three cubic struts to which it is connected are all equal.

15. The building block of claim 14 wherein each of said twelve struts is equal in length.

16. A load bearing structural frame comprising:

a plurality of said building blocks of claim 12 wherein each outer end of each of said outwardly extending struts is connected to three other outer ends of said outwardly extending struts.

17. The method of constructing a load bearing structural frame comprising the steps of:

selecting a set of rigid compression bearing struts having an appropriate strength and substantially equal in size to one another, creating a set of unicubes from said set of struts, each unicube having twelve cubic struts and eight diagonal struts extending outwardly from each of the eight corners of the cubic struts, each of said eight outwardly extending struts having an outboard end, assembling said set of unicubes by connecting said outboard ends of one outwardly extending strut of four separate unicubes such that the outwardly extending struts of each corner of each unicube forms one strut of a tetrax with three outwardly extending struts of three other adjacent unicubes.

18. The method of manufacturing a load bearing structural frame comprising:

selecting an appropriate set of substantially equal rigid compression bearing struts, connecting a first subset of said struts into a set of cubic frames, connecting a second subset of said struts into a set of tetrax frames, there being approximately twice as many tetrax frames as cubic frames, connecting an end point of each strut of each tetrax frame to a corner of a cubic frame and connecting each corner of a cubic frame to an end point of a tetrax frame.

19. The method of manufacturing a load bearing structural frame comprising:

selecting an appropriate set of approximately equal rigid compression bearing struts, assembling a first set of said struts into a set of tetrax structures, assembling a second set of said struts into a second set of predetermined structures, having eight predetermined corner points, and connecting an end of a strut of eight separate ones of said tetrax structures to said eight corner points of each of said second set of structures, said step of connecting including connecting each tetrax strut end to a corner point of one of said second set of structures.

* * * * *